July 11, 1950      D. M. KROENER      2,514,500
LEVEL DEVICE
Filed Oct. 18, 1946
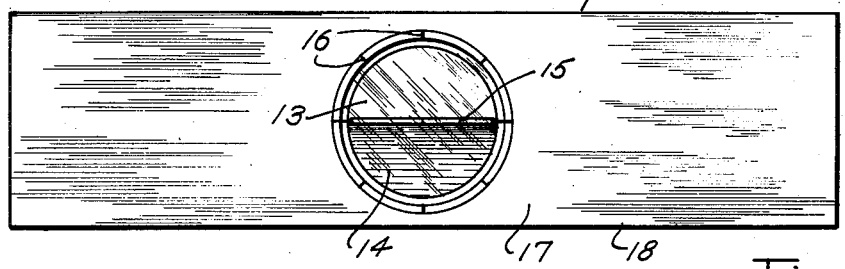
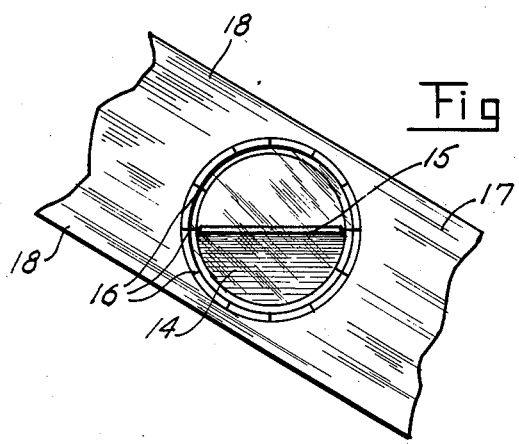
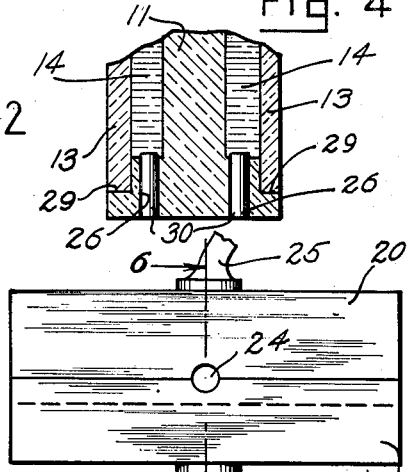
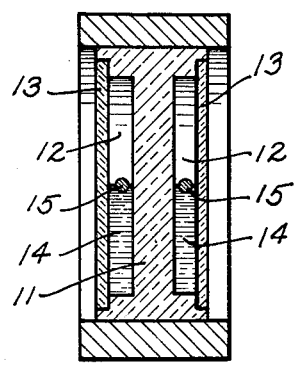
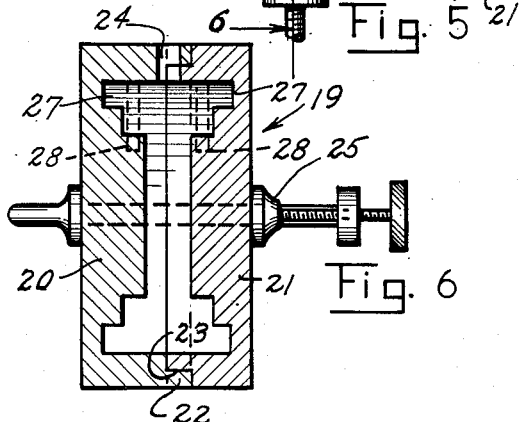
INVENTOR.
Delbert M. Kroener
BY
Attorneys Patented July 11, 1950

2,514,500

UNITED STATES PATENT OFFICE 2,514,500

LEVEL DEVICE

Delbert M. Kroener, Dayton, Ohio

Application October 18, 1946, Serial No. 704,264

2 Claims. (Cl. 33—206)

This invention relates to spirit level devices.

A main object of the invention is to provide a novel and improved level device which is simple in construction, easy to assemble and accurate in performance.

A further object of the invention is to provide an improved spirit level device, the level device being very easy and inexpensive to fabricate by the method and means herein provided.

Further objects and advantages of the invention will become apparent from the following description and claims, and from the accompanying drawings, wherein:

Figure 1 is a side elevational view of a carpenter's level employing a spirit bulb according to the present invention.

Figure 2 is a view similar to Figure 1 of the mid-portion of the level of Figure 1, said level being in tilted position.

Figure 3 is a transverse vertical cross-sectional view taken through the mid-portion of the level of Figure 1.

Figure 4 is a detail-cross-sectional view of the spirit bulb of the level of Figure 1 showing the sealing means for the bulb.

Figure 5 is a top plan view of a mold for forming the core of the level bulb according to the present invention.

Figure 6 is a cross-sectional view taken on line 6—6 of Figure 5.

Referring to the drawings 11 designates a generally cylindrical core of molded transparent material such as glass, transparent plastic, or the like. Core 11 is formed with circular recesses 12, 12 on each side of its main body portion, and cemented into each side of the core overlying the recesses 12, 12 are transparent cover discs 13, 13 of suitable material such as glass. Each recess 12 is half full of transparent level fluid 14, and floating on the top surface of the fluid 14 is a diametrically extending float 15 of buoyant material which functions as an indicating pointer. The outer rim of the core 11 is suitably calibrated at each side thereof with markings representing degrees of angular deviation of the level, as shown at 16. The level bulb is preferably mounted centrally in a block 17 having straight parallel top and bottom edges 18, 18. Since the bulb is symmetrical the angular deviation of the block may be read from either side thereof, and if one face of the bulb becomes marred or broken, the level is still usable by employing the other face to obtain level indications.

The bulb core is fabricated by pouring molten transparent material into a mold indicated generally at 19. Mold 19 comprises a pair of interfitting hollow segments 20 and 21, segment 20 being formed with a shouldered rim 22 which fits into an annular seat 23 formed at the rim of segment 21. The joining plane defined by the edge of the rim of segment 21 is the central plane of the mold cavity defined by the hollow segments 20 and 21. An aperture 24 is provided in the top of the mold 19 through which the molten transparent material is introduced. During the molding operation, segments 20 and 21 are secured together by a clamp device 25 which is conventional in construction.

After the core has cooled and is in a hardened condition it is removed from the mold 19 by loosening the clamp device 25 and detaching the mold segments 20 and 21. A pair of openings, shown at 26, 26 are formed in the annular peripheral portions of the core. These openings may be formed during the molding operation by providing rods as shown in dotted view at 27, 27 which are supported in recesses 28, 28 in the mold segments. Rods 27 may consist of short lengths of wire wrapped in asbestos or the like so that they may be easily removed from the hardened core after the molding operation. The transparent discs 13, 13 are secured in annular seats 29 provided therefor at the rim portions of core 11 by suitable cement.

The float members 15, 15 are placed in the respective core cavities prior to the securement of the transparent discs 13, 13 in their seats 29, 29. The transparent level fluid 14 is poured into the core cavities through the pre-formed openings 26, 26 and said openings are then sealed up by a sealing compound such as a mixture of tar, cement and pulverized sand, forming plugs shown at 30, 30. The completed level bulb may then be secured in a suitable block such as is shown at 17.

Since the core 11 is transparent, the level may be read either by light reflected from its front face or by light passing through the front face from the rear thereof. This feature facilitates accurate use of the level over a wide range of lighting conditions.

While a specific embodiment of a level device has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. In a level, a bulb comprising a flat cylindrical core of transparent material formed axially in its opposite ends with circular recesses, transparent disks secured to the ends of said core in closing relation to said recesses to define cylindrical chambers, bodies of liquid half-filling said chambers, buoyant rods floating in said bodies of liquid in said chambers in diametrical relation to said transparent disks, whereby the relative positions of said rods are visible from each side of said bulb, and said rods can exhibit an axial deviation of said bulb from the horizontal through deviation of said rods from coincidence as well as a transverse deviation of said bulb from the horizontal.

2. A level bulb comprising a cylindrical block of transparent material formed in its opposite ends with relatively shallow cylindrical recesses, said recesses being axially aligned with each other and with said cylindrical block and spaced at a substantial axial distance from each other so as to define a partition of substantial thickness between said recesses, transparent disks secured to the opposite ends of said block and closing the outer ends of said recesses to form relatively shallow cylindrical chambers, bodies of liquid half-filling said chambers, buoyant rods floating diametrically in said chambers in the liquid therein, both of said rods being independently movable with respect to each other and visible through either end of the bulb in sufficiently spaced relation so as to be capable of visually indicating both axial and transverse deviation of said bulb from the horizontal and axial and transverse coincidence of said bulb with the horizontal.

DELBERT M. KROENER.

REFERENCES CITED

The following references are of record in the file of this patent:

UNITED STATES PATENTS

| Number | Name | Date |
|---|---|---|
| 7,263 | Ladd, Jr. | Apr. 9, 1850 |
| 588,990 | Harvey | Aug. 31, 1897 |
| 860,990 | Plimpton | July 23, 1907 |
| 904,014 | Roach | Nov. 17, 1908 |
| 1,113,805 | McNeil | Oct. 13, 1914 |
| 2,305,678 | Cravaritis et al. | Dec. 22, 1942 |